(12) United States Patent
Oros (10) Patent No.: US 9,796,315 B1
(45) Date of Patent: Oct. 24, 2017

(54) CONTAINER HOLDING SYSTEM (71) Applicant: Honda Motor Co., Ltd., Tokyo (JP)

(72) Inventor: Benjamin M. Oros, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/253,466

(22) Filed: Aug. 31, 2016

(51) Int. Cl.
*A47K 1/08* (2006.01)
*B60N 3/10* (2006.01)
*A47G 23/02* (2006.01)

(52) U.S. Cl.
CPC ......... *B60N 3/102* (2013.01); *A47G 23/0225* (2013.01)

(58) Field of Classification Search
CPC ................................ B60N 2/102; B60N 3/102
See application file for complete search history.

(56) References Cited

U.S. PATENT DOCUMENTS

| | | | |
|---|---|---|---|
| 5,618,018 A | 4/1997 | Baniak | |
| 5,634,621 A * | 6/1997 | Jankovic | B60N 3/102 224/926 |
| 5,829,726 A | 11/1998 | Withun | |
| 5,845,888 A * | 12/1998 | Anderson | B60N 2/468 224/926 |
| 5,997,082 A * | 12/1999 | Vincent | B60N 3/108 248/311.2 |
| 6,530,549 B2 * | 3/2003 | Schaal | B60N 3/102 224/549 |

FOREIGN PATENT DOCUMENTS

| | | |
|---|---|---|
| CN | 102642491 A | 8/2012 |
| CN | 204055493 U | 12/2014 |
| DE | 102009055627 A1 | 5/2011 |
| EP | 1132255 A2 | 9/2001 |
| JP | H05330373 A | 12/1993 |
| JP | H11129803 A | 5/1999 |
| JP | 2008055950 | 3/2008 |
| KR | 100368999 B1 | 1/2003 |
| WO | 200020250 A1 | 4/2000 |

OTHER PUBLICATIONS

"Cup Holder—Oval Polished Face" https://www.streetrodhq.com/detail/15454/Cup_Holder_Oval_Polished_Face.html (Accessed Jun. 28, 2016).

* cited by examiner

*Primary Examiner* — Amy J. Sterling
(74) *Attorney, Agent, or Firm* — Honda Patents & Technologies North America, LLC; Clifford B Vaterlaus (57) ABSTRACT

A system for holding containers, such as cups, in a vehicle includes a housing that may form part of a vehicle console. The housing may have an upper surface for receiving the container and defining an opening leading to a compartment. A support for supporting the container may be attached to the housing. The support may be movable between a retracted position in which the support is received within the compartment, and an extended position in which the support extends out of the compartment and laterally over the upper surface to hold the container on the upper surface. The support may be stored in the retracted position when not in use so that the upper surface is usable for other purposes.

18 Claims, 13 Drawing Sheets

FIG. 13 even a US 9,796,315 B1

CONTAINER HOLDING SYSTEM

TECHNICAL FIELD

The present disclosure relates generally to devices for holding containers, and more particularly, but not necessarily entirely, to cup holders for use in vehicles or vehicle consoles.

BACKGROUND

Cup holders are commonly provided in vehicles in areas conveniently accessible to drivers or passengers. Such cup holders may occupy space that makes it difficult to allow for other features to be accommodated in the vehicle. For example, cup holders are known to be placed on vehicle consoles. However, such consoles may have limited space which makes it more difficult to accommodate other components commonly found in the console, such as control knobs, buttons, or handles, electrical outlets, storage compartments, etc. It would therefore be desirable to provide a system for holding cups and other such containers that can be accommodated in a small space. It would also be desirable to provide such a container holding system that can be easily stowed so that it does not unnecessarily occupy space when not in use.

SUMMARY

In accordance with one embodiment of the present disclosure, a container holding system may include a housing having a compartment and an upper surface. The upper surface may have a support portion for receiving a container, and an opening leading to the compartment. A support may be provided for supporting the container. The support may be movable between a retracted position in which the support is received within the compartment, and an extended position in which the support extends out of the compartment and laterally over the support portion of the upper surface to hold the container on the support portion.

In accordance with another embodiment of the present disclosure, a container holding system may include a housing having a compartment. A support may be provided for supporting a container. The support may be movable between a retracted position in which the support is received within the compartment, and an extended position in which the support extends out of the compartment. A biasing member may be joined to the housing and the support. The biasing member may provide a biasing force in an upward and lateral direction to the support.

In accordance with yet another embodiment of the present disclosure, a container holding system may include a housing having a compartment. A support may be provided for supporting a container. The support may include a first arm having a first end portion and a second end portion opposite the first end portion. The first arm may be movably connected to the housing at the first end portion. The support may also include a second arm having a connection end portion and a free end. The connection end portion of the second arm may be pivotally attached to the first arm at a location between the first end portion and the second end portion. The support may be movable between a retracted position in which the support is received within the compartment, and an extended position in which the support extends out of the compartment.

BRIEF DESCRIPTION OF THE DRAWINGS

Certain embodiments of the present disclosure will be better understood from the following description taken in conjunction with the accompanying drawings in which.

DETAILED DESCRIPTION

Embodiments are hereinafter described in detail in connection with the views and examples of FIGS. 1-13, wherein like numbers indicate the same or corresponding elements throughout the views. It should, of course, be understood that the description and drawings herein are merely illustrative and that various modifications and changes can be made in the structures disclosed without departing from the concepts of the present disclosure.

Figure 1:
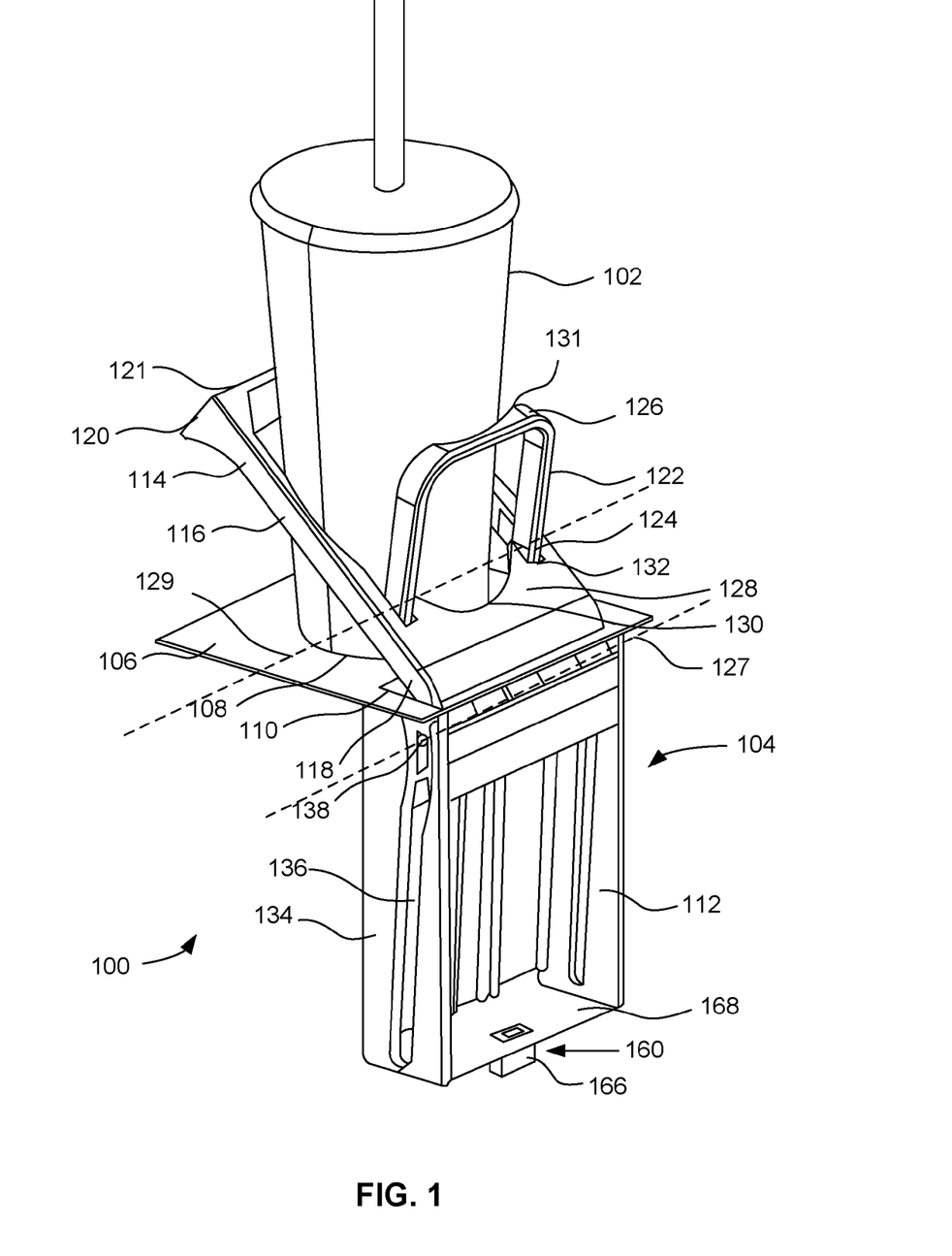
FIG. 1 is a perspective view of a first embodiment of the present disclosure holding a cup.

FIG. 1 illustrates a perspective view of a first embodiment of a container holding system, indicated generally at 100. The container holding system 100 of FIG. 1 is shown holding a container 102, shown as a cup. However it will be understood that the container holding system 100 can be used for any variety of containers, such as cups, cans, bottles, cartons and the like. The container holding system 100 may be particularly suited for implementation in a vehicle. However, it will be appreciated that the container holding system 100 may be used in other environments where it may be desirable to support a container or other such object within the scope of the present disclosure.

The container holding system 100 may include a housing, indicated generally at 104. The housing 104 may form part of a console commonly arranged between front seats of a vehicle. However, the housing 104 may form part of an arm rest, table or any other such structure. The housing 104 may include an upper surface 106 having a support portion 108 for supporting the container 102. The upper surface 106 may include an opening 110 leading to a compartment 112.

Figure 6:
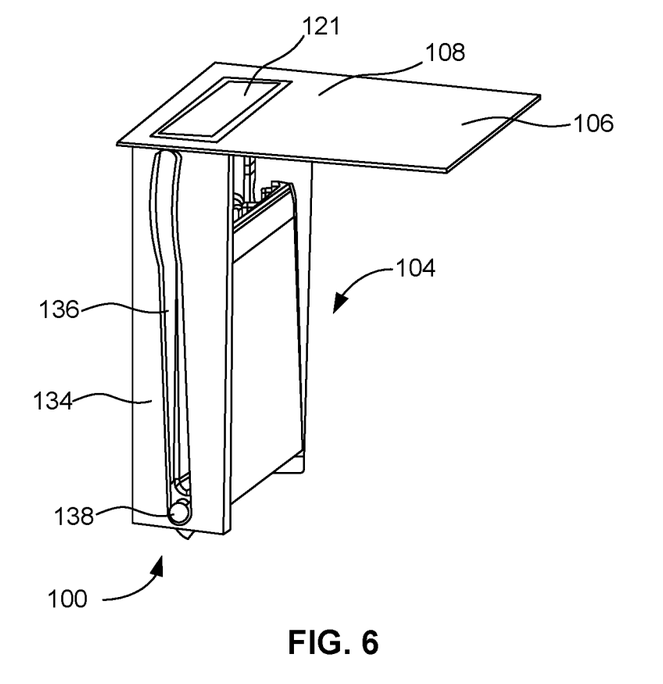
FIG. 6 is a perspective view of the embodiment of FIG. 1 in a retracted position.

The container holding system 100 may also include a support 114 for holding the container 102. The support 114 may be movable between a retracted position in which the support 114 is received within the compartment 112 as shown in FIG. 6, and an extended position in which the support 114 extends out of the compartment 112 and laterally over the support portion 108 of the upper surface 106, as shown in FIGS. 1-4, to hold the container 102 on the support portion 108. The support portion 108 may be laterally offset from the opening 110 of the housing 104 so that the container 102 may be supported at a location spaced apart from the opening 110 on a side of the opening 110. Accordingly, when a container 102 that is sized to fit completely through the support 114 is held by the container holding system 100, the container 102 is supported on the bottom by the support portion 108 of the support surface 106 on a side of the opening 110. In this arrangement, the support 114 may support or hold the container 102 on the sides. If a container 102 that is too large to fit completely through the support 114 is held by the container holding system 100, the container 102 may be supported both vertically and laterally by the support 114.

It will be understood that the present arrangement allows the container 102 to be received directly on or above the support portion 108 when the support 114 is in the extended position. However, when the container holding system 100 is not in use and the support 114 is in the retracted position, the support portion 108 of the upper surface 106 may be free for use for other purposes. Moreover, it will be understood that when the support 114 is in the retracted position, the support 114 may be folded to occupy a smaller space. Thus, limited space may be used more efficiently.

In one embodiment, the support 114 may include a first arm 116, having a first end portion 118 and a second end portion 120 opposite the first end portion 118. The first arm 116 may be movably connected to the housing 104 at the first end portion 118 in a manner discussed more fully below. The second end portion 120 may form a free end of the support 114 in the extended position. A cover 121 may be provided on the second end portion 120 of the first arm 116. The cover 121 may be formed integrally as part of the first arm 116 and may be sized and configured to close the opening 110 when the support 114 is in the retracted position to prevent objects or debris from entering the compartment 112.

The support 114 may include a second arm 122 having a connection end portion 124 and a free end 126. The connection end portion 124 of the second arm 122 may be pivotally attached to the first arm 116 using a fastener, pin, or the like, at a location between the first end portion 118 and the second end portion 120. In one embodiment, the first end portion 118 of the first arm 116 may be movably attached to the housing 104 about a first axis 127, and the connection end portion 124 of the second arm 122 may be pivotally attached to the first arm 116 about a second axis 129 that is substantially parallel to the first axis 127.

The first arm 116 may be formed as a substantially rectangular frame, and a brace 128 may be provided on an interior of the frame for supporting the container 102. The brace 128 may have an interior shape 130 in the form of a curve or any other suitable shape configured to correspond to the container 102. Similarly, the free end 126 of the second arm 122 may have a recess 131 of any suitable shape to correspond to the container 102 to assist in holding the container 102 in place. The brace 128 may also include one or more grooves 132 for receiving the second arm 122 when the support 114 is in the extended position. In one embodiment the second arm 122 may be formed as a substantially U shaped member that has a shorter length than the first arm 116 such that the second arm 122 may be configured to fit within an interior of the substantially rectangular frame shape of the first arm 116 when the support 114 is in the retracted position. The support 114 can therefore be configured to occupy less space when not in use, since it can be folded into a compact configuration and stowed within the compartment 112.

Figure 2:
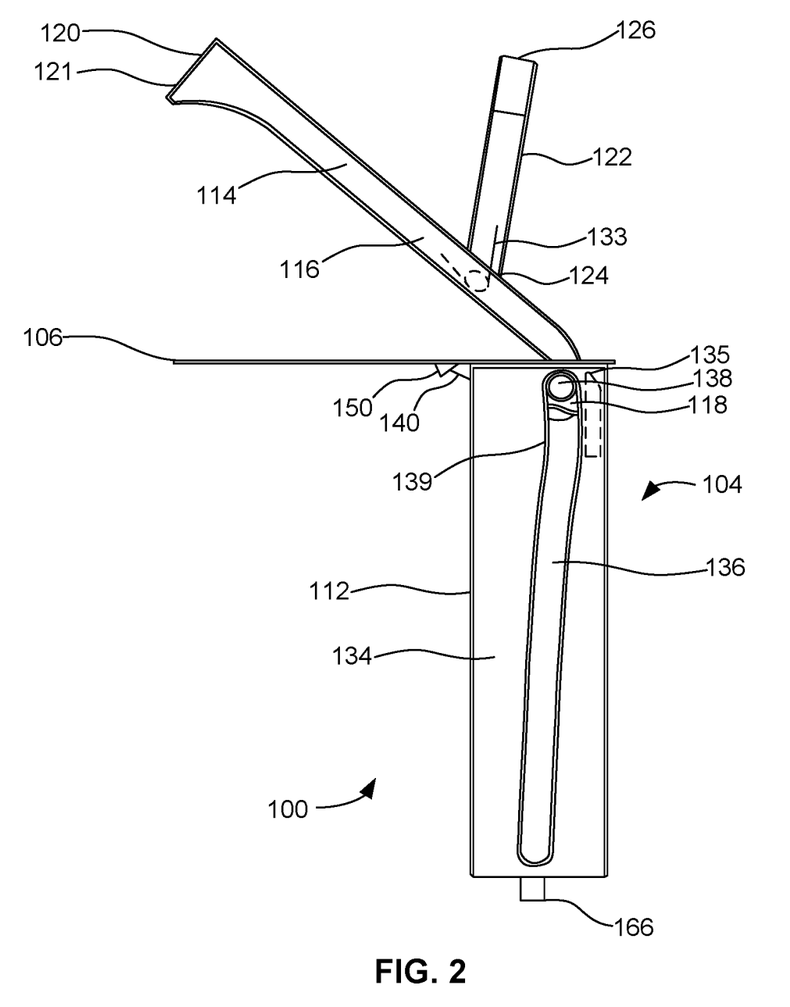
FIG. 2 is a side view of the embodiment of FIG. 1 of the present disclosure.
Figure 3:
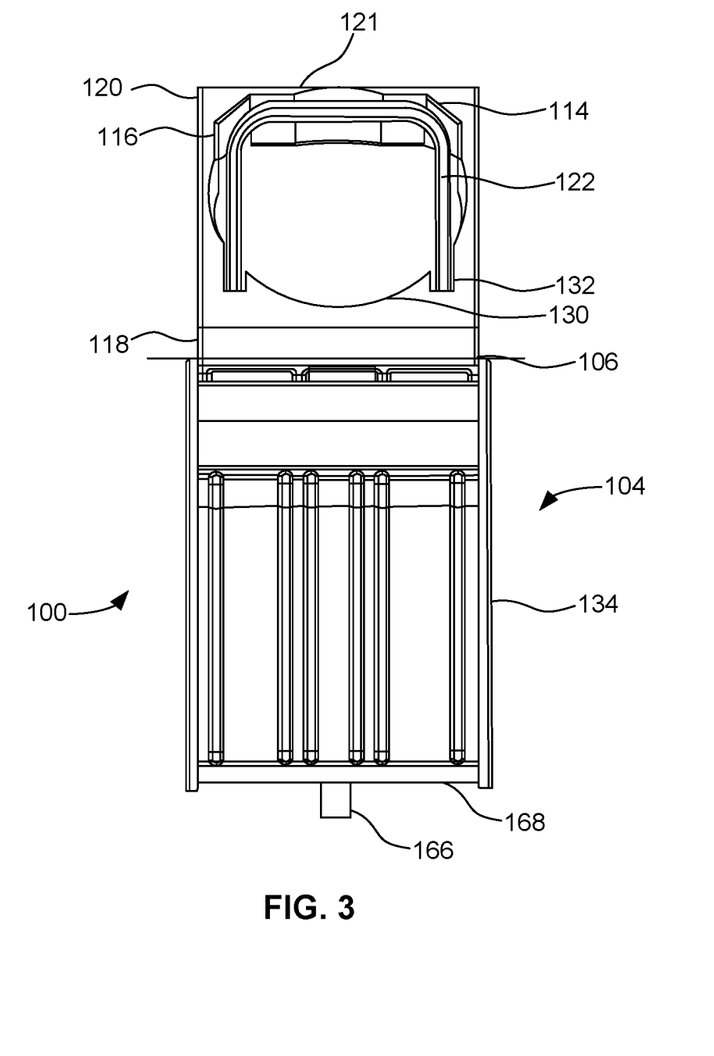
FIG. 3 is a front view of the embodiment of FIG. 1.

In one embodiment as best shown in FIG. 2, a spring 133 may be provided on the connection end portion 124 of the second arm 122 to bias the second arm 122 toward a position in which the free end 126 is spaced apart from the first arm 116. Alternatively, the second arm 122 may be manually pivoted to be folded within the first arm 116 or to move the free end 126 of the second arm 122 away from the first arm 116. A guide 135 may be provided in the compartment 112 for contacting the second arm 122 as the support 114 is moved to the retracted position to thereby move the second arm 122 into the first arm 116. The guide 135 may also be sized and positioned to hold the second arm 122 in the first arm 116 when the support is in the retracted position to prevent the second arm 122 from opening while inside the compartment 112.

The compartment 112 may also have one or more sidewalls 134 defining a space for receiving the support 114 in the retracted position. In the embodiment shown in FIGS. 1-8, the compartment 112 may have a pair of opposing sidewalls 134. The sidewalls 134 may have one or more slots 136 for receiving a projection 138 attached to the first arm 116 at the first end portion 118. Two projections 138 may be provided, one on each side of the first arm 116 to thereby form the first axis 127. The projections 138 may be configured to slide and rotate within the slots 136 to guide movement of the support 114 as the support 114 moves from the retracted position to the extended position. One embodiment of the slots 136 may include a bend 139 configured to assist the first arm 116 to rotate as the support 114 moves from the retracted position to the extended position. Accordingly, the first arm 116 can move more easily to a position extending over the support portion 108 of the upper surface 106 when the support 114 is in the extended position. Also, the projections 138 may be arranged on the first arm 116 at a location with respect to the housing 104 such that the projections 138 may remain below the upper surface 106 when the support 114 is in the extended position.

Figure 4:
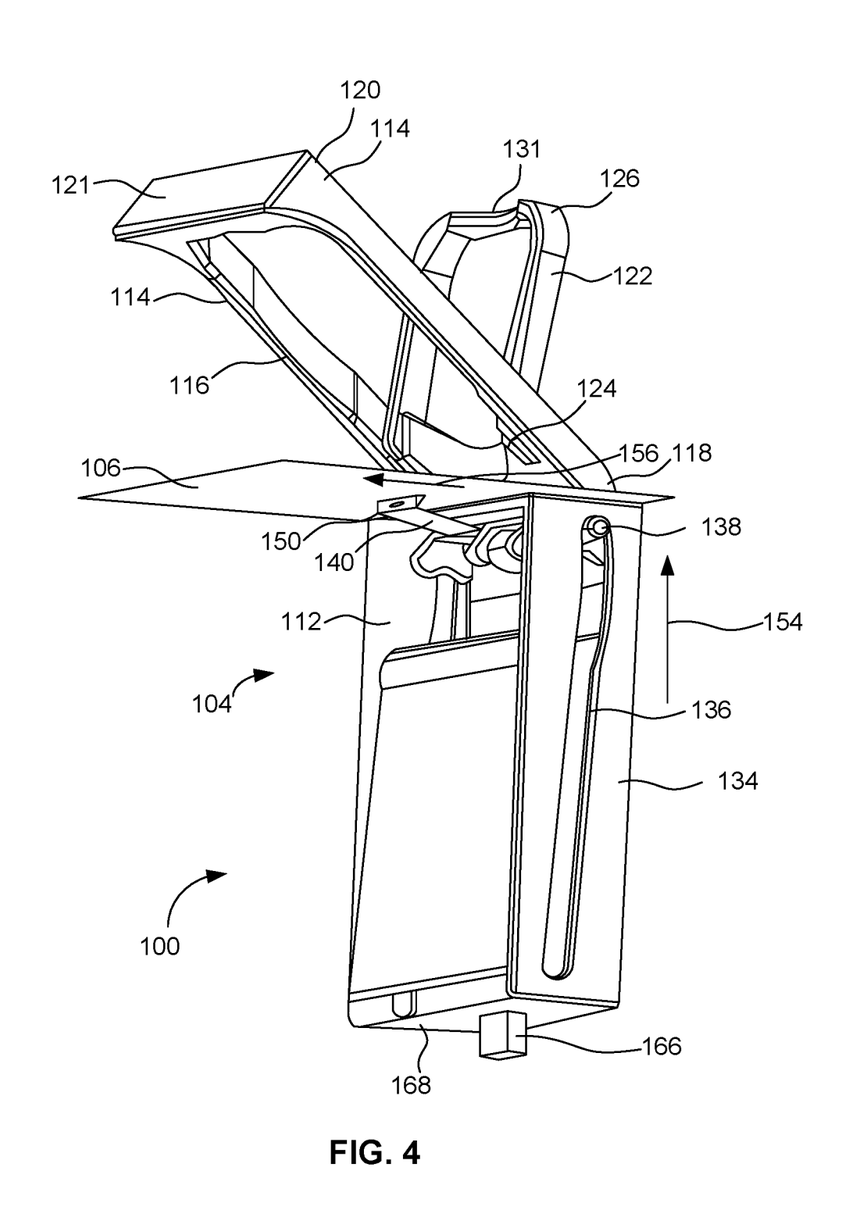
FIG. 4 is a perspective view of the embodiment of FIG. 1.
Figure 5:
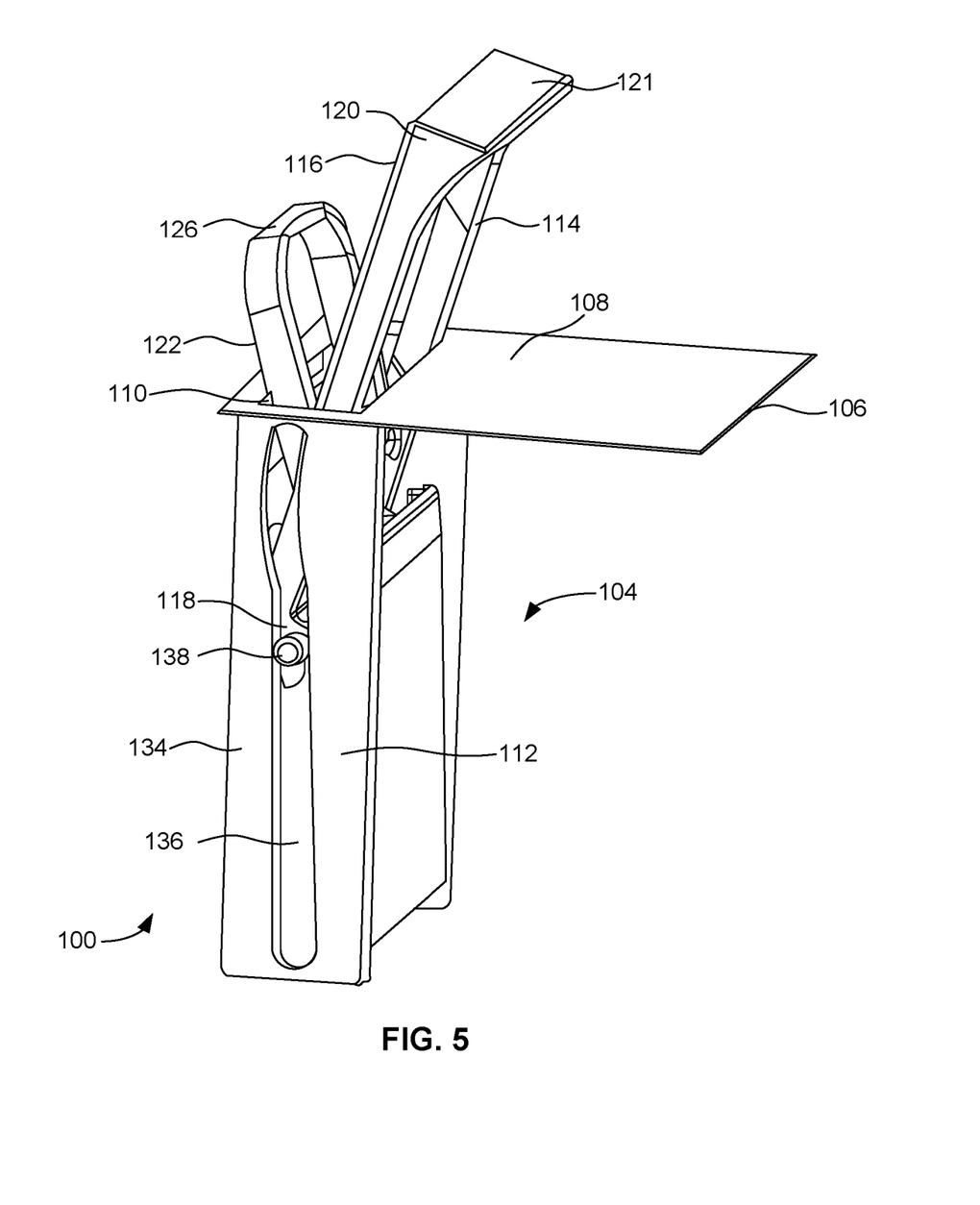
FIG. 5 is a perspective view of the embodiment of FIG. 1 in a partially extended position.
Figure 9:
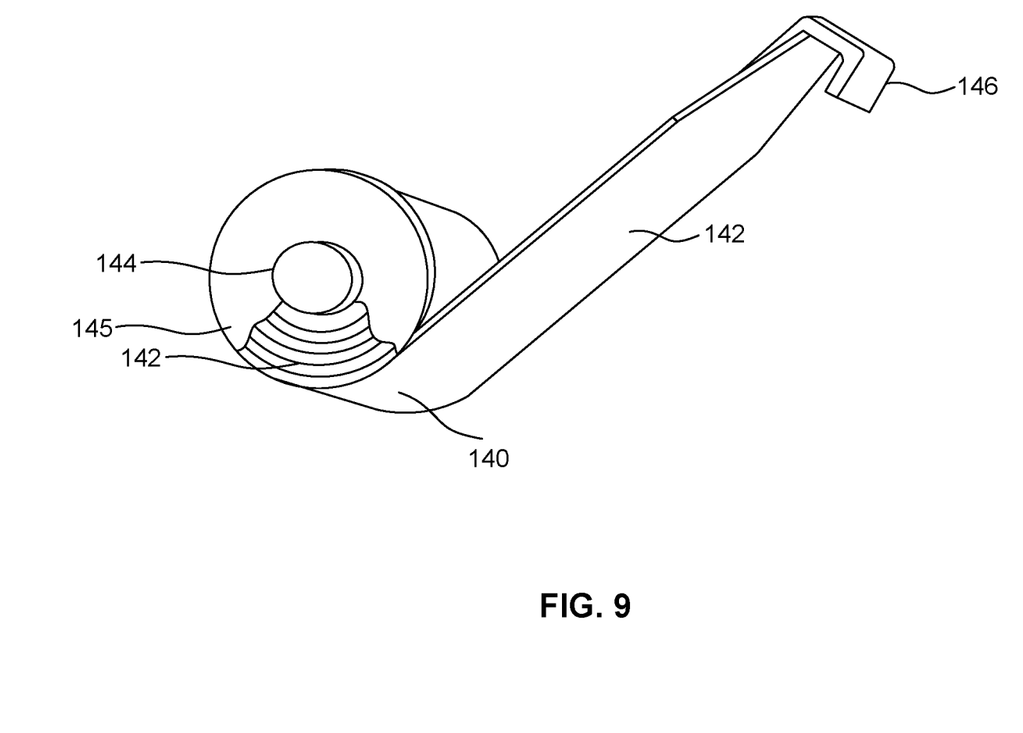
FIG. 9 is a perspective view with a portion broken away of one embodiment of a biasing member useful within the scope of the present disclosure.
Figure 10:
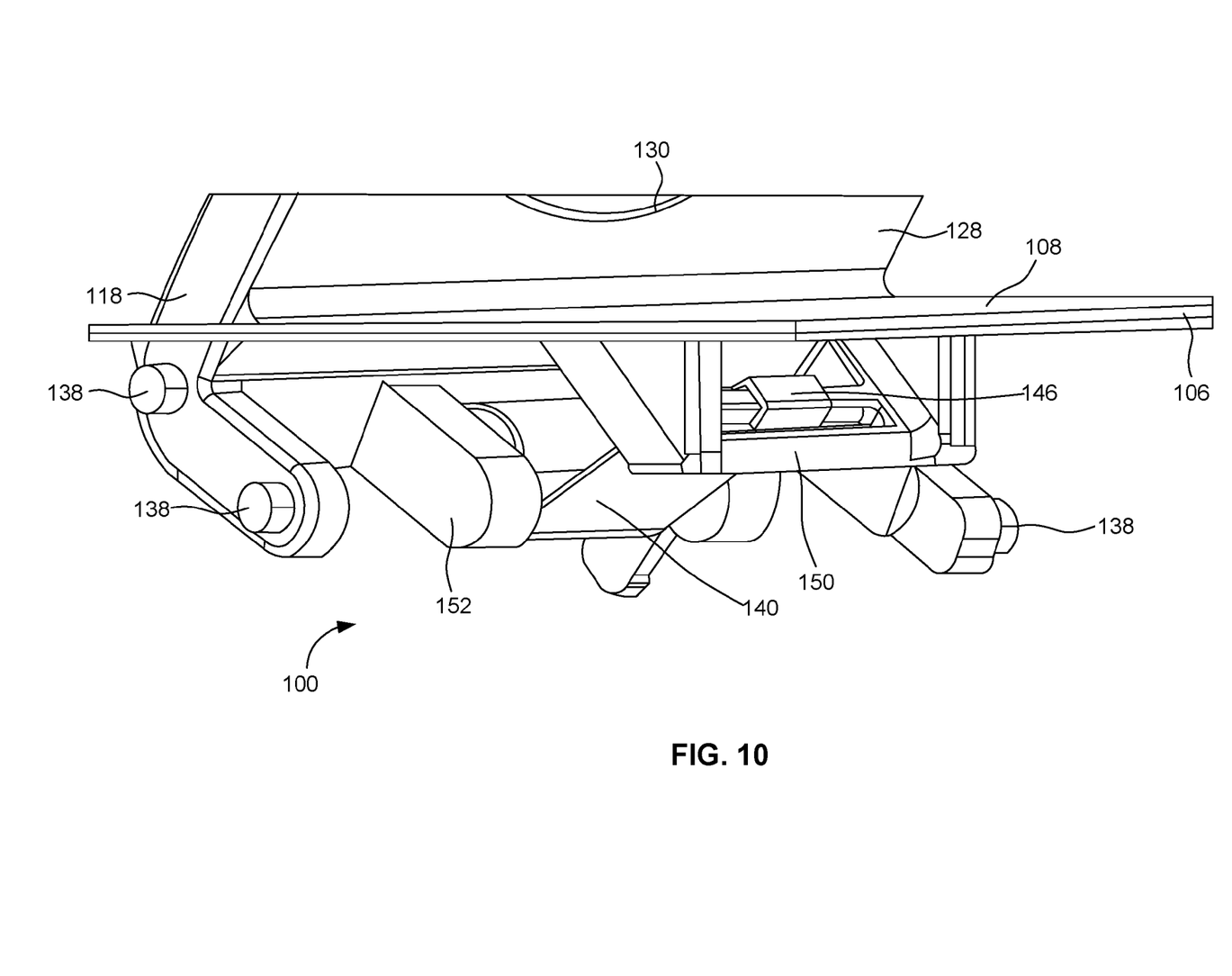
FIG. 10 is a perspective view of the biasing member of FIG. 9 attached to a portion of a housing according to an alternative embodiment of the present disclosure.

A biasing member 140, as best shown in FIGS. 4 and 9, may be provided to bias the support 114 to the extended position. The biasing member 140 may include a resilient ribbon member 142 that may be rolled around a shaft 144. A cover 145 may be provided on opposing sides of the ribbon member 142. The cover 145 is shown partially broken away in FIG. 9 to show a portion of the ribbon member 142 in a rolled condition. The ribbon member 142 may be biased to roll around the shaft 144 causing the biasing member 140 to tend to retract. Such a biasing member may sometimes be referred to as a constant-force spring. A hook 146 may be provided on an end of the ribbon member 142 for connecting the biasing member 140 to a catch 150 attached to the housing 104 as shown most clearly in FIGS. 4 and 10. In one embodiment, the shaft 144 may be rotatably attached to the first end portion 118 of the first arm 116. A pair of tabs 152, as shown most clearly in FIG. 10, may be provided for receiving the shaft 144 to attach the biasing member 140 to the support 114.

In use, the biasing member 140 may be arranged to pull the first end portion 118 of the support 114 toward the catch 150 on an underside of the upper surface 106 beneath the support portion 108 to thereby bias the support 114 in the extended position. With the catch 150 being positioned beneath the support portion 108, when the projections 138 reach the top of the slots 136, the biasing member 140 continues to bias the first arm 116 to cause it to extend laterally over the support portion 108 at an angle with respect to the upper surface 106. Thus, the biasing member 140 may be configured to provide a bias force in an upward direction 154 and a lateral direction 156 to the first arm 116, as shown most clearly in FIG. 4. The position of the catch 150 may also be configured to attach the biasing member 140 at a position that holds the first arm 116 at an angle with respect to the upper surface 106 so that the first arm 116 does not fall flat against the upper surface 106.

It will be understood that alternative embodiments of the present disclosure may use different types of biasing members, such as coil springs or compression springs, and different number of springs. Moreover, the springs may be arranged at different locations with respect to the support 114 and the housing 104 to bias the support 114 in any suitable manner.

Figure 11:
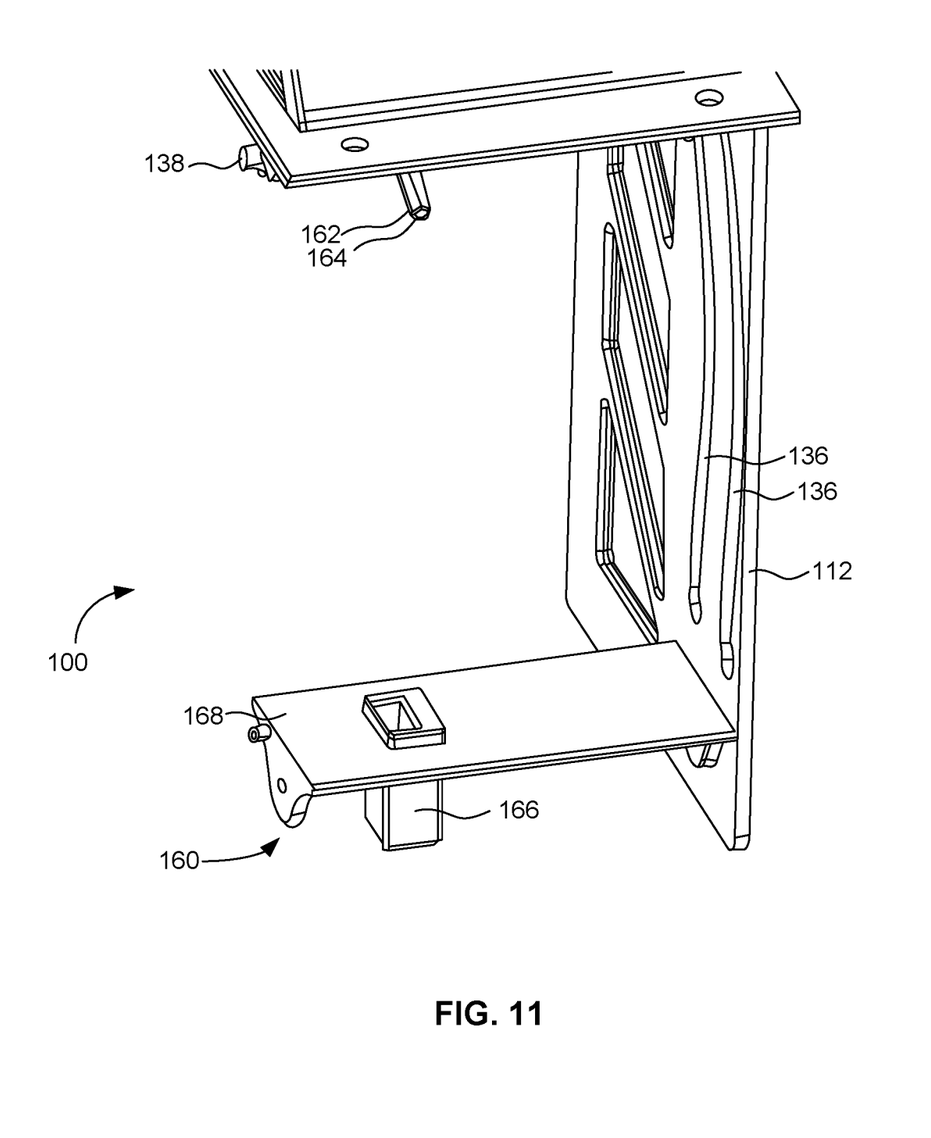
FIG. 11 is a partial perspective view of the embodiment of FIG. 10 of the present disclosure.

The container holding system 100 may also include a latch mechanism, indicated generally at 160 in FIGS. 1 and 11. In one embodiment, the latch mechanism 160 may include a latch arm 162 having a latch hook 164 provided on the first end portion 118 of the first arm 116. A receiver 166 may be provided on the housing 104 for receiving the latch arm 162. The receiver 166 may be provided on a bottom wall 168. Alternatively, the receiver 166 may be attached at other locations, and the position of the latch arm 162 and the receiver 166 may be reversed.

One embodiment of the latch mechanism 160 may include a push-push type latch device known to those skilled in the art. Such device latches the latch arm 162 in the receiver 166 when the latch arm 162 is inserted in the receiver 166. The latch mechanism 160 may be released by pushing on the cover 121 of the first arm 116 which pushes the latch arm 162 further into the receiver 166 and subsequently releases the latch arm 162. Once the latch arm 162 is released, the support 114 is allowed to automatically move to the extended position under the force of the biasing member 140.

Figure 7:
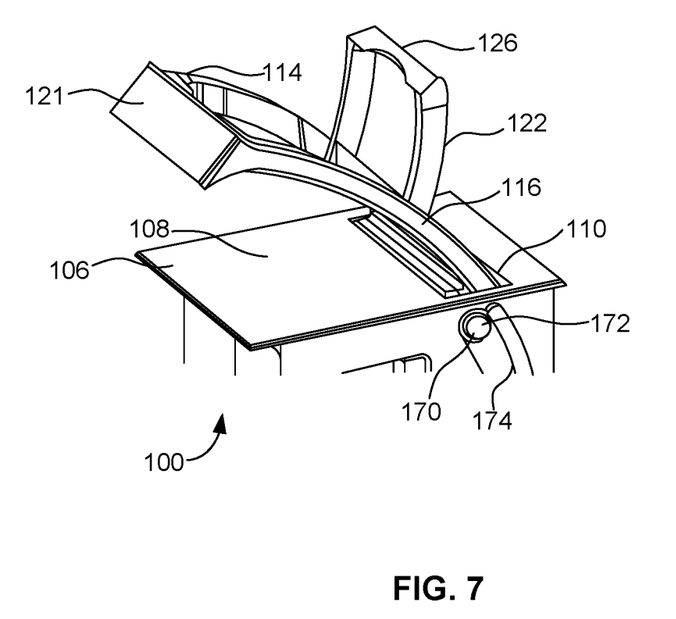
FIG. 7 is a perspective view of a portion of an alternative embodiment in an extended position.
Figure 8:
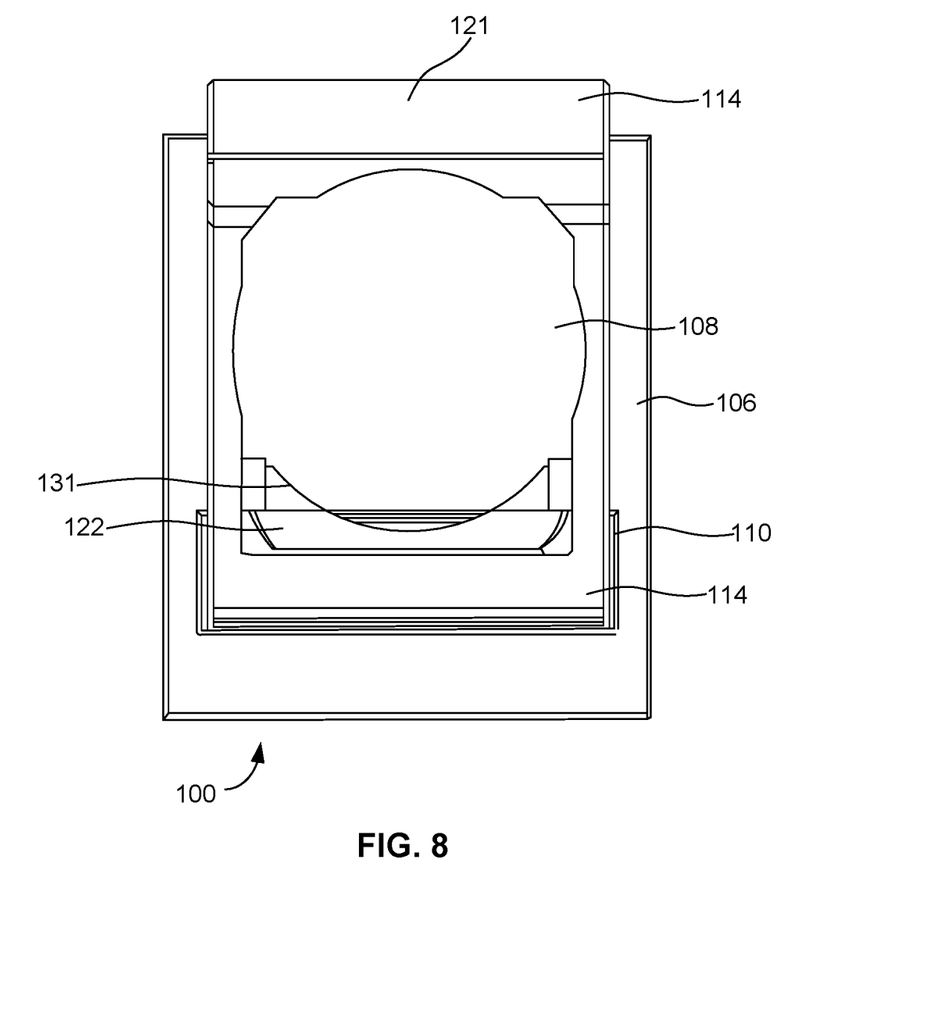
FIG. 8 is a top view of the embodiment of FIG. 7 in the extended position.
Figure 12:
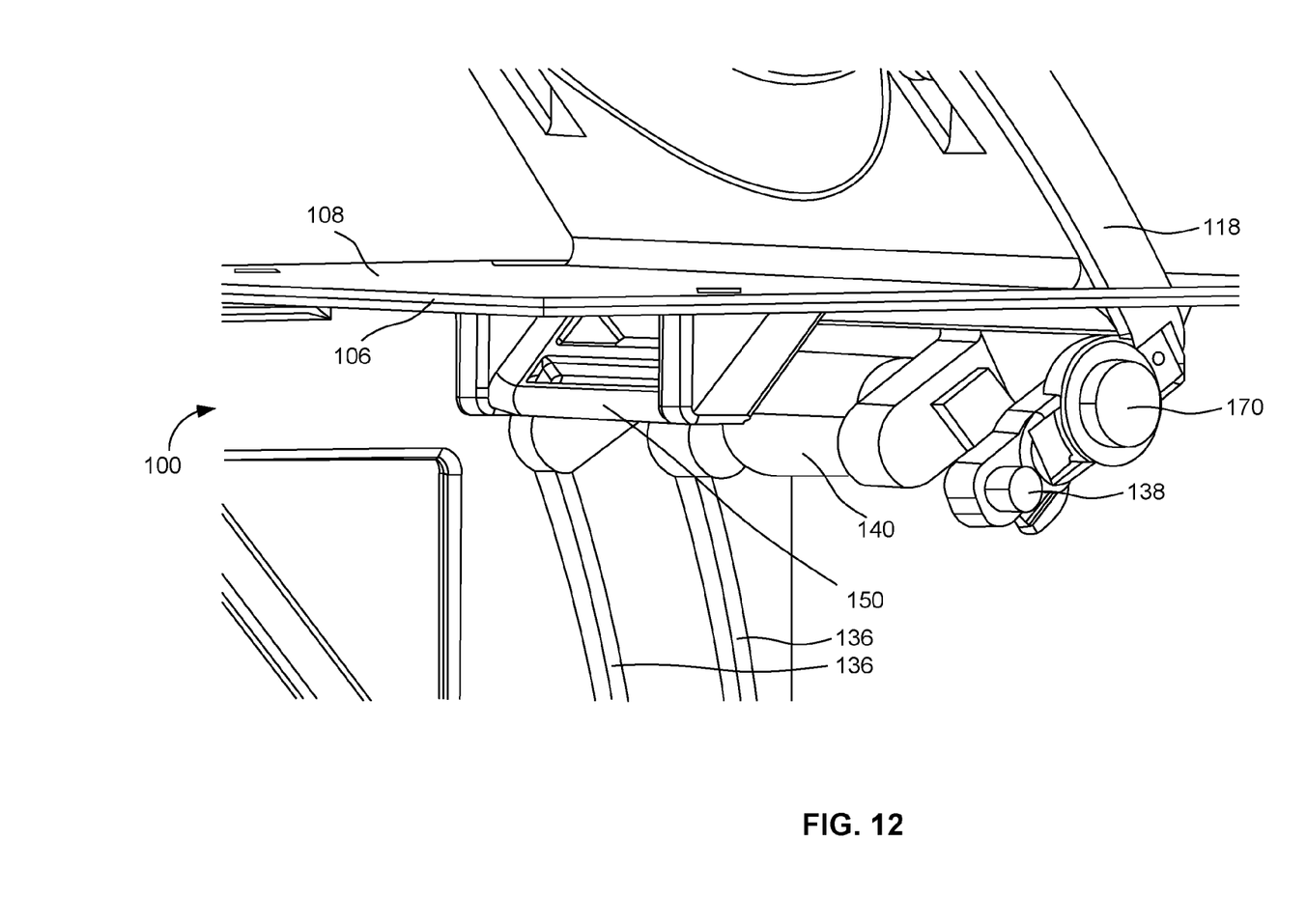
FIG. 12 is another partial perspective view of the embodiment of FIGS. 10 and 11.
Figure 13:
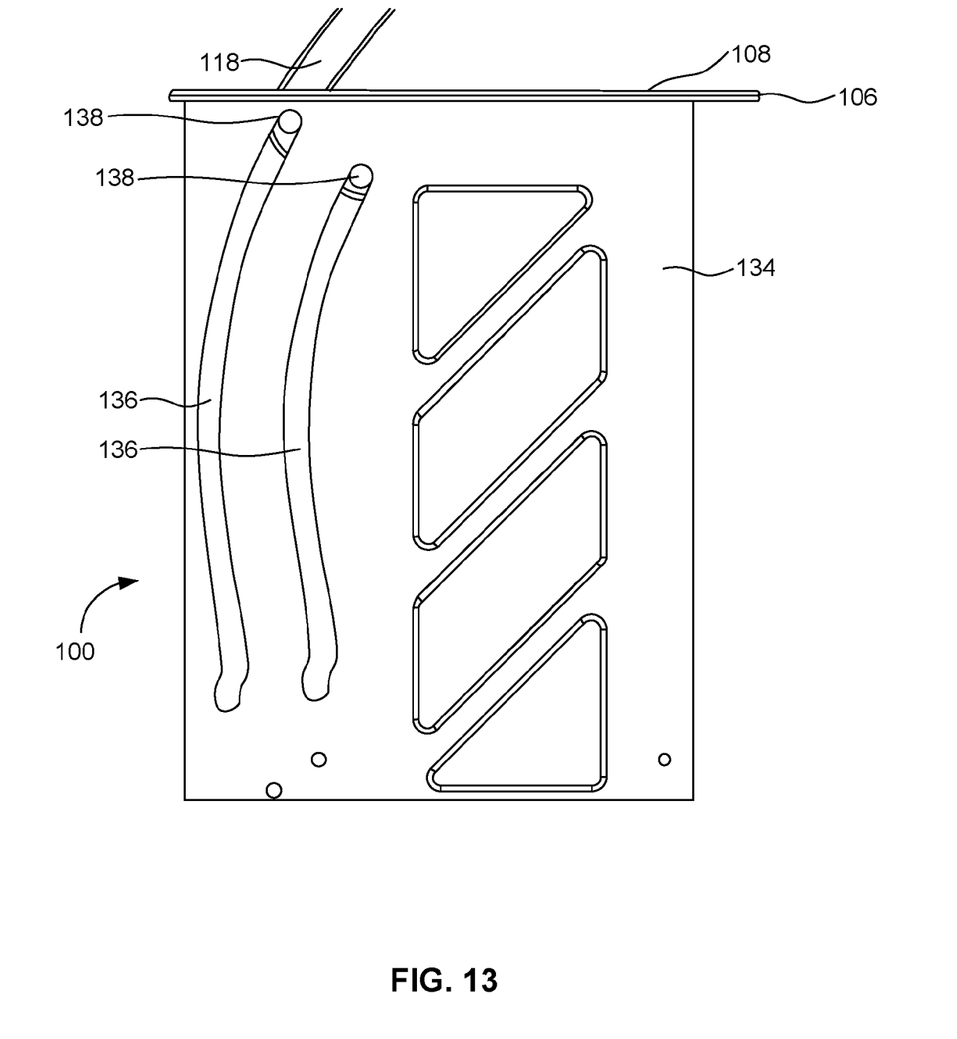
FIG. 13 is a partial side view of the embodiment of FIGS. 10-12.

As shown in FIGS. 7 and 12, embodiments of the present disclosure may include a damper 170. One arrangement of the damper 170 may include a resilient bumper 172 carried on the first arm 116 that may fit in a damper slot 174. The bumper 172 may be configured to absorb shock when the support 114 reaches the extended position and the bumper 172 reaches an end of the damper slot 174. This may allow the container holding system 100 to operate more smoothly and avoid rattling and damage. It will be understood that some embodiments of the damper 170 may not include a resilient bumper 172.

One embodiment of the bumper 172 may frictionally engage the damper slot 174 such that the bumper 172 rotates as the bumper 172 moves in the damper slot 174. The damper 170 may also include a rotation damping mechanism. For example, one embodiment of the damper 170 may include a viscous medium damper known to those skilled in the art for reducing the speed of rotation. Thus, rotational speed of the bumper 172 may be reduced as the support 114 moves between the retracted and extended positions. The damper 170 may also allow free-wheeling in one direction, for example, for allowing the support 114 to be moved to the retracted position without resistance from the damper 170.

Alternative embodiments may include gear teeth (not shown) on the bumper 172 and the damper slot 174 to enhance engagement of the bumper 172 with the damper slot 174 to allow the damper 170 to provide more control to the movement of the support 114.

Referring now to FIGS. 10-13, an alternative embodiment of the present disclosure is provided. The embodiment shown in FIGS. 10-13 includes many of the features described with reference to the embodiments of FIGS. 1-9, and some of the additional features will now be discussed. The embodiment of FIGS. 10-13 may include a plurality of slots 136 each for receiving one of a plurality of projections 138 on the first arm 116. Using a plurality of slots 136 and projections 138 may make controlling movement of the first arm 116 easier, and may make positioning of the first arm 116 over the support portion 108 of the upper surface 106 more precise. Using a plurality of slots 136 and projections 138 may also help make the first arm 116 more stable.

In use, when the container holding system 100 is in the retracted position, the cover 121 may be pushed to release the latch mechanism 160, allowing the support 114 to automatically extend out of the compartment 112. The first arm 116 extends upwardly and laterally over the support portion 108 of the upper surface 106. The second arm 122 may then be folded such that the free end 126 is spaced apart from the first arm 116. A container 102 may then be placed directly on the support portion 108 of the upper surface 106 such that the container 102 is surrounded and laterally supported by the first arm 116 and the second arm 122. Alternatively, a larger container 102 may be vertically and laterally supported by the first arm 116 and the second arm 122 so that the container 102 does not rest on the support portion 108, but rather is held above the support portion 108.

To stow the support 114, the second arm 122 may be folded such that the free end 126 may be received within the first arm 116. The first arm 116 may then be pushed into the compartment 112 through the opening 110 until the latch arm 162 is inserted into the receiver 166 and the latch mechanism 160 is latched. The container holding system 100 may therefore be configured to provide the benefits of holding containers and allow for the efficient use of space.

The foregoing description of embodiments and examples has been presented for purposes of illustration and description. It is not intended to be exhaustive or to limit the invention to the forms described. Numerous modifications are possible in light of the above teachings. Some of those modifications have been discussed and others will be understood by those skilled in the art. The embodiments were chosen and described in order to best illustrate certain principles and various embodiments as are suited to the particular use contemplated. The scope of the invention is, of course, not limited to the examples or embodiments set forth herein, but can be employed in any number of applications and equivalent devices by those of ordinary skill in the art. Rather it is hereby intended the scope of the invention be defined by the claims appended hereto.

What is claimed is:

1. A container holding system comprising:
    a housing having a compartment and an upper surface, the upper surface having a support portion for supporting a container and an opening leading to the compartment;
    a support for holding the container, the support being movable between a retracted position in which the support is received within the compartment, and an extended position in which the support extends out of the compartment and laterally over the support portion of the upper surface to hold the container on the support portion, and
    a latch arm joined to one of the housing and the support, and a receiver joined to the other of the housing and the support for holding the support in the retracted position.

2. The container holding system of claim 1 wherein the support further comprises:
   a first arm having a first end portion and a second end portion opposite the first end portion, the first arm movably connected to the housing at the first end portion;
   a second arm having a connection end portion and an opposite end, the connection end portion of the second arm pivotally attached to the first arm at a location between the first end portion and the second end portion.

3. The container holding system of claim 2 wherein a cover is provided on the second end portion of the first arm, the cover having a planar surface that is configured to close the opening when the support is in the retracted position such that the planar surface of the cover is coplanar with the upper surface.

4. The container holding system of claim 2 wherein the first arm is formed as a substantially rectangular frame, and a brace is provided on an interior of the frame for supporting the container, the brace comprising a wall that is joined to the frame along a length and a width of the frame.

5. The container holding system of claim 4 wherein the brace includes a groove for receiving the second arm when the support is in the extended position.

6. The container holding system of claim 4 wherein the second arm is formed as a substantially U shaped member configured to fit within the interior of the substantially rectangular frame when the support is in the retracted position.

7. The container holding system of claim 1 further comprising a biasing member joined to the housing and the support for biasing the support to the extended position.

8. The container holding system of claim 7 further comprising a shaft attached to the support, wherein the biasing member wraps around the shaft and a hook is disposed on an end of the biasing member, the hook engaging a catch on the housing to attach the biasing member to the housing to bias the support to the extended position.

9. A container holding system comprising:
   a housing having a compartment;
   a support for holding a container, the support being movable between a retracted position in which the support is received within the compartment, and an extended position in which the support extends out of the compartment;
   a spring joined to the housing and the support, the spring providing a biasing force in an upward and lateral direction to the support; and
   a pair of tabs disposed on the support, and a shaft is rotatably joined between the pair of tabs, the spring being wrapped around the shaft.

10. The container holding system of claim 9 further comprising a hook disposed on an end of the spring, the hook engaging a catch on the housing to attach the spring to the housing to bias the support to the extended position.

11. The container holding system of claim 9 wherein the housing includes an upper surface having a support portion for receiving a container, and a catch attaching the spring is attached on an underside of the upper surface beneath the support portion.

12. The container holding system of claim 9 wherein the housing includes an upper surface having a support portion for receiving a container, and wherein the spring is attached to hold the support to extend at an angle with respect to the upper surface over the support portion.

13. A container holding system comprising:
   a housing having a compartment; and
   a support for supporting a container, the support comprising:
      a first arm formed as a frame having a first end portion and a second end portion opposite the first end portion, the first arm movably connected to the housing at the first end portion;
      a second arm having two spaced apart legs terminating at a connection end portion and a cross member connecting the two spaced apart legs at an opposite end, the connection end portion of the second arm pivotally attached directly to the first arm on an interior side of the frame at an intermediate location between the first end portion and the second end portion;
      wherein the support is movable between a retracted position in which the support is received within the compartment, and an extended position in which the support extends out of the compartment.

14. The container holding system of claim 13 wherein a length of the first arm is greater than a length of the second arm.

15. The container holding system of claim 13 wherein the first end portion of the first arm is movably attached to the housing about a first axis, and the connection end portion of the second arm is pivotally attached to the first arm about a second axis that is substantially parallel to the first axis.

16. The container holding system of claim 13 further comprising a biasing member joined to the housing and the support, the biasing member providing a biasing force in an upward and lateral direction to the support.

17. The container holding system of claim 13 wherein the first arm comprises a wall at the first end portion defining a brace for supporting the container, the wall having a groove that receives a portion of the second arm when the support is in the extended position.

18. The container holding system of claim 1 wherein when the support is in the extended position, a space is defined that extends continuously in a vertical direction between the support portion of the upper surface and a top of the support on an interior side of the support for the container to reside therein.

* * * * *